US011328322B2

(12) United States Patent
Garg et al.

(10) Patent No.: US 11,328,322 B2
(45) Date of Patent: May 10, 2022

(54) METHOD AND APPARATUS FOR PROVISIONING OPTIMIZED CONTENT TO CUSTOMERS

(71) Applicant: [24]7.ai, Inc., San Jose, CA (US)

(72) Inventors: Priyank Garg, Bangalore (IN); Manoj Rajshekar, San Jose, CA (US)

(73) Assignee: [24]7.ai, Inc., San Jose, CA (US)

( * ) Notice: Subject to any disclaimer, the term of this patent is extended or adjusted under 35 U.S.C. 154(b) by 248 days.

(21) Appl. No.: 16/126,592

(22) Filed: Sep. 10, 2018

(65) Prior Publication Data
US 2019/0080351 A1 Mar. 14, 2019

Related U.S. Application Data

(60) Provisional application No. 62/557,034, filed on Sep. 11, 2017.

(51) Int. Cl.
*G06Q 30/02* (2012.01)

(52) U.S. Cl.
CPC ..... *G06Q 30/0253* (2013.01); *G06Q 30/0206* (2013.01); *G06Q 30/0252* (2013.01); *G06Q 30/0255* (2013.01); *G06Q 30/0261* (2013.01); *G06Q 30/0271* (2013.01)

(58) Field of Classification Search
CPC ............... G06Q 30/02; G06Q 30/0253; G06Q 30/0252; G06Q 30/0255; G06Q 30/0261; G06Q 30/0271
See application file for complete search history.

(56) References Cited

U.S. PATENT DOCUMENTS

| 7,831,586 | B2 * | 11/2010 | Reitter | G06Q 30/00 707/709 |
|---|---|---|---|---|
| 8,539,351 | B2 * | 9/2013 | Baciu | G06Q 30/02 715/275 |
| 9,602,885 | B2 * | 3/2017 | Weast | H04N 21/4333 |
| 9,654,661 | B1 * | 5/2017 | Okada | G06K 19/06037 |
| 9,691,086 | B1 * | 6/2017 | Deodhar | G06F 16/9577 |
| 2005/0137939 | A1 * | 6/2005 | Calabria | G06Q 30/02 705/26.1 |
| 2007/0276726 | A1 | 11/2007 | DiMatteo | |
| 2007/0288454 | A1 * | 12/2007 | Bolivar | G06Q 30/02 |
| 2007/0288514 | A1 * | 12/2007 | Reitter | G06F 16/951 |
| 2008/0177640 | A1 * | 7/2008 | Gokturk | G06Q 30/0603 705/26.62 |
| 2008/0201643 | A1 | 8/2008 | Nagaitis et al. | |

(Continued)

FOREIGN PATENT DOCUMENTS

KR 20160022407 A * 8/2014

*Primary Examiner* — Thuy N Nguyen
(74) *Attorney, Agent, or Firm* — Perkins Coie LLP; Michael Glenn

(57) ABSTRACT

A method and an apparatus for provisioning optimized content to customers are disclosed. The method includes determining at least one attribute associated with a customer active on a web interface associated with an enterprise. A plurality of baseline contents and a plurality of content elements are accessed from a database and at least one baseline content and at least one content element are selected based on the at least one attribute associated with the customer. A customized advertisement is generated using the at least one baseline content and the at least one content element.

27 Claims, 7 Drawing Sheets

(56) References Cited

U.S. PATENT DOCUMENTS

| | | | |
|---|---|---|---|
| 2009/0012863 A1* | 1/2009 | Saephan | G06Q 30/0269 705/14.54 |
| 2009/0148045 A1* | 6/2009 | Lee | G06T 11/00 382/190 |
| 2009/0187477 A1* | 7/2009 | Bardin | G06Q 30/0273 705/14.69 |
| 2009/0228802 A1* | 9/2009 | Shan | G06Q 30/02 715/733 |
| 2010/0158391 A1* | 6/2010 | Cunningham | H04N 21/8586 382/209 |
| 2010/0329573 A1* | 12/2010 | Tsujino | G09G 3/006 382/209 |
| 2011/0072343 A1* | 3/2011 | Baciu | G06Q 30/02 715/275 |
| 2011/0161790 A1* | 6/2011 | Junior | G06Q 30/0267 715/205 |
| 2011/0251896 A1* | 10/2011 | Impollonia | H04N 21/26603 705/14.55 |
| 2012/0192226 A1 | 7/2012 | Zimmerman et al. | |
| 2012/0245990 A1* | 9/2012 | Agarwal | G06Q 30/0202 705/14.25 |
| 2013/0067510 A1 | 3/2013 | Ahanger et al. | |
| 2013/0144719 A1* | 6/2013 | Yeo | G06F 16/951 705/14.54 |
| 2013/0305145 A1* | 11/2013 | Jackson | G06F 40/103 715/246 |
| 2014/0115432 A1* | 4/2014 | Turner | G06F 40/114 715/205 |
| 2014/0229291 A1* | 8/2014 | Schoen | G06Q 30/0269 705/14.66 |
| 2015/0012363 A1* | 1/2015 | Grant | G06Q 30/0269 705/14.66 |
| 2015/0178780 A1* | 6/2015 | Yang | G06Q 30/02 705/14.66 |
| 2015/0235240 A1* | 8/2015 | Chang | G06Q 30/0202 705/7.31 |
| 2015/0278882 A1* | 10/2015 | Ju | G06Q 30/0246 705/14.45 |
| 2017/0017804 A1* | 1/2017 | Rajkumar | G06F 21/6245 |
| 2017/0034542 A1* | 2/2017 | Yabu | G06Q 30/00 |
| 2017/0199853 A1* | 7/2017 | Kim | G06F 3/04842 |
| 2018/0060358 A1* | 3/2018 | Jiang | G06F 16/24578 |
| 2019/0243860 A1* | 8/2019 | Kotas | G06Q 30/0255 |

* cited by examiner

METHOD AND APPARATUS FOR PROVISIONING OPTIMIZED CONTENT TO CUSTOMERS

CROSS REFERENCE TO RELATED APPLICATIONS

This application claims priority to U.S. provisional patent application Ser. No. 62/557,034, filed Sep. 11, 2017, which is incorporated herein in its entirety by this reference thereto.

TECHNICAL FIELD

The present technology generally relates to digital advertising, and more particularly to a method and apparatus for provisioning optimized advertisement content to customers of an enterprise.

BACKGROUND

Many enterprises rely on digital advertising to communicate with existing and potential users of enterprise offerings. The existing and potential users of products, services and/or information offered by an enterprise are referred to herein as customers of the enterprise.

The enterprises display advertisements or 'Ads' on enterprise channels, such as enterprise Websites, as well as on other non-enterprise channels to attract customer traffic through their content. The display of Ads on enterprise channels is referred to as 'on-domain advertising', whereas the display of advertisements on non-enterprise channels is referred to as 'off-domain advertising'. An example of a non-enterprise channel may include a third-party website. Some examples of third-party websites include retailer websites, websites of E-commerce entities, news related websites, search engine related websites, and the like.

The Ads may include content designed to attract customers, some of whom may purchase the enterprise offerings displayed in the Ads. For example, the Ads may include textual content, image or graphical content, video content, and the like, to entice customers to click on them. Most conventional solutions rely on product categories and keywords to predict customer's intent and provide matching advertisements to the customers. However, the actual content within the advertisements is generally retained as provided by the enterprise.

In many example scenarios, an efficacy of the advertisements displayed to the customers is reduced on account of providing content in an 'as-is' form as provided by an Ad server of an Ad agency contracted by the enterprise. For example, if a smartphone manufacturer provides a thumbnail image of a model of a smartphone and the same is displayed on an E-commerce Website, where the background of the image area matches the color of the Smartphone, then the advertisement may not stand out and attract the attention of the customer. In another illustrative example, the image of the model may be too small as compared to the overall ad space and as such may not create the desired impact on the customer. Further, the conventional solutions do not take into account individual preferences of the customers while displaying advertisements to the customers.

Therefore, there is a need for optimizing content provisioned to the customers. Moreover, there is a need to determine what content works best for a customer or a customer persona as a whole for performing the optimization of the content to be provisioned to the customer.

SUMMARY

In an embodiment of the invention, a computer-implemented method for provisioning optimized content to customers of an enterprise is disclosed. The method determines, by an apparatus, at least one attribute associated with a customer active on a web interface associated with an enterprise. The method accesses, by the apparatus, a plurality of baseline contents and a plurality of content elements from a database. The baseline contents are extracted from advertisements received by the apparatus from one or more advertisement servers to configure the plurality of baseline contents. The method selects, by the apparatus, at least one baseline content from among the plurality of baseline contents and at least one content element from among the plurality of content elements based on the at least one attribute associated with the customer. The method generates, by the apparatus, a customized advertisement using the at least one baseline content and the at least one content element.

In an embodiment of the invention, an apparatus for provisioning optimized content to customers of an enterprise is disclosed. The apparatus includes a processor and a memory. The memory stores instructions therein, that when executed by the processor, causes the apparatus to determine at least one attribute associated with a customer active on a Web interface associated with an enterprise. The apparatus accesses a plurality of baseline contents and a plurality of content elements from a database. The baseline contents are extracted from advertisements received by the apparatus from one or more advertisement servers to configure the plurality of baseline contents. The apparatus selects at least one baseline content from among the plurality of baseline contents and at least one content element from among the plurality of content elements based on the at least one attribute associated with the customer. The apparatus generates a customized advertisement using the at least one baseline content and the at least one content element.

In an embodiment of the invention, another computer-implemented method for provisioning optimized content to customers of an enterprise is disclosed. The method detects, by an apparatus, an occurrence of a customer browsing event on a web interface associated with an enterprise. The method receives, by the apparatus, information related to at least one of: customer activity on the web interface, device information related to an electronic device used for accessing the web interface, historical browsing data of the customer, and profile data of the customer. The method determines, by the apparatus, at least one attribute associated with the customer active on the web interface based on the received information. The method extracts, by the apparatus, a baseline content from an advertisement received by the apparatus from an advertisement server for display on a display area associated with the web interface. The method selects, by the apparatus, at least one content element from among a plurality of content elements stored in a database based on the at least one attribute associated with the customer. The method determines, by the apparatus, an optimum size and a layout configuration from a plurality of layout configurations for displaying the baseline content and the at least one content element. The method stitches, by the apparatus, the baseline content and the at least one content element based on the optimum size and the layout configuration to dynamically generate a customized advertisement for the customer. The method causes, by the apparatus, the display of the customized advertisement on the display area associated with the web interface.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
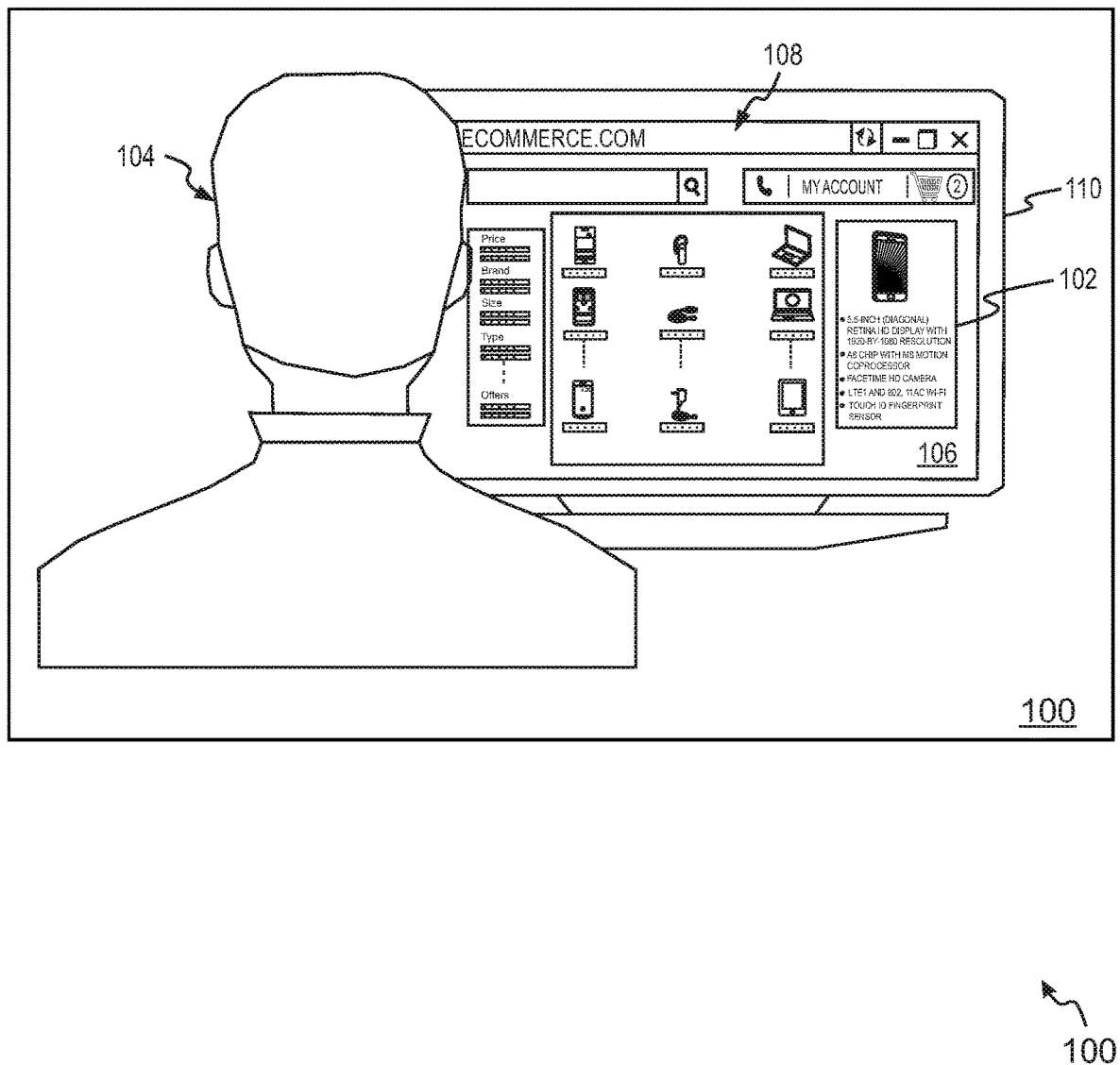
FIG. 1 depicts a representation showing content in form of an advertisement provided to a customer, in accordance with an example scenario.

FIG. 1 depicts a representation 100 showing content in form of an advertisement 102 provided to a customer 104, in accordance with an example scenario.

In the representation 100, the customer 104 is depicted to have accessed a web interface 106 associated with an enterprise. Though the web interface 106 is depicted as a single web page UI in the representation 100, it is noted that the term 'web interface' of an enterprise as used herein implies one or more user interfaces (UIs) displaying enterprise related content and capable of being accessed over the Internet. For example, the web interface may correspond to web page UIs of an enterprise website or graphical user interfaces (GUIs) of a mobile application associated with the enterprise. In the representation 100, the web interface 106 corresponds to UIs of a website of an E-commerce/Retail enterprise. The website may be hosted on a remote web server. The customer 104 is depicted to have used a web browser application 108 installed within an electronic device 110 (exemplarily depicted to be a desktop computer) to retrieve one or more web pages associated with the website from the remote web server. The UIs associated with one or more web pages, configuring the web interface 106, may be retrieved from the remote web server over a communication network, such as the Internet. It is understood that the web interface 106 may attract a large number of existing and potential customers, such as the customer 104.

It is noted that the electronic device 110 is depicted to be a desktop computer for illustration purposes. The customer 104 may alternatively use any other electronic device, such as a smartphone, a mobile phone, a tablet device, a Web-enabled wearable device and the like, to access the web interface 106. Further, it is noted that though the web interface 106 is depicted to be associated with an E-commerce website, the web interface 106 may correspond to any one of a social networking website, an educational content related portal, a news aggregator portal, a gaming or sports content related website, a web search engine service providing website, a banking website or any such website related to a corporate or governmental entity.

The web interface 106 may be configured to display content such as advertisements or 'Ads'. The Ads may include content designed to attract customer' attention. For example, the ads may include textual content, image or graphical content, animation, video content, and the like, to entice customers to click on them. Most conventional solutions rely on product categories and keywords to predict customer's intent and provide matching advertisements to the customers. In some scenarios, customer's activity on a web interface, such as the web interface 106, is tracked and the customer's intention is predicted using the information related to the tracked activity of the customer. For example, the customer 104 may have clicked on several images related to a smartphone on the web interface 106. Such activity of the customer 104 on the web interface 106 may suggest a customer's inclination to buy a phone during the current journey of the customer 104 on the web interface 106. Accordingly, the web interface 106 may be caused to display an advertisement, such as the advertisement 102, along with other advertisements related to accessories for the phone brand displayed in the advertisement 102.

In FIG. 1, the advertisement 102 corresponds to an off-domain advertisement, or more specifically, the advertisement 102 from enterprise ABC is displayed on a third-party website and not on the website of the enterprise ABC. It is noted that the advertisements, such as the advertisement 102, may also be displayed on the websites of the enterprises associated with the offering displayed on the respective advertisements. For example, advertisement 102 may be displayed on the website of the enterprise ABC, such as for example on 'www.enterprise-abc.com', in a similar or a different form than that depicted in the representation 100 in FIG. 1.

In many example scenarios, an efficacy of content displayed to the customers is reduced on account of the manner in which the content is displayed, especially on an off-domain web interface. In many example scenarios, content such as advertisements, provided by an Ad server of an Ad agency contracted by an advertiser when displayed on an off-domain web interface is not optimized for customer viewing purposes and is displayed in an 'as received' form. For example, the smartphone manufacturer associated with the advertisement 102 may have provided a thumbnail image of the phone model and the same is displayed 'as-is' on an E-commerce website. In an example scenario, the thumbnail image of the phone model may be too small as compared to the overall ad space and as such the Ad may not create the desired impact on the customer 104. Moreover, if the background of the image area matches the color of the phone model, then the Ad may not stand out and attract the attention of the customer 104. Further, the content included in the advertisement 102 also does not take into account individual preferences of the customer 104.

Various embodiments of the present technology provide a method and apparatus that are capable of overcoming these and other obstacles and providing additional benefits. More specifically, various embodiments of the present technology disclosed herein present techniques for provisioning optimized content to the customers. An apparatus for provisioning optimized content, such as optimized enterprise advertisements, to customers is explained with reference to FIG. 2.

Figure 2:
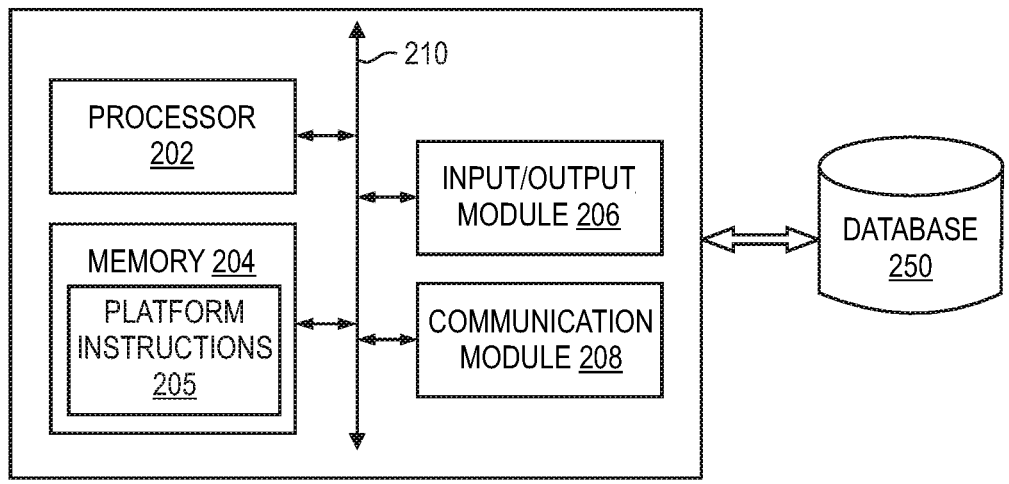
FIG. 2 is a block diagram of an apparatus configured to provision optimized content to customers, in accordance with an embodiment of the invention.

FIG. 2 is a block diagram of an apparatus 200 configured to provision optimized content to customers, in accordance with an embodiment of the invention. The term 'content' as used herein mainly refers to advertisement content. The content may be embodied as textual content, one or more images, animation, graphics, audio content, video content or any combination thereof. The apparatus 200 is configured to determine what content works best for a customer or a customer persona as a whole for dynamically optimizing content to be provisioned to the customer.

The apparatus 200 includes at least one processor, such as a processor 202 and a memory 204. It is noted that although the apparatus 200 is depicted to include only one processor, the apparatus 200 may include more number of processors therein. In an embodiment, the memory 204 is capable of storing machine executable instructions, referred to herein as platform instructions 205. Further, the processor 202 is capable of executing the platform instructions 205. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.).

In at least one example embodiment, the memory 204 may include logic/instructions for detecting baseline content in advertisements. For example, the memory 204 may include logic/instructions to detect baseline content, such as an image of a product or a service (including the name of the product or the service), in an advertisement. The logic/instructions for detecting baseline content may include, at least in part, object detection algorithms, which may or may not include face recognition logic. Further, the memory 204 may include logic/instructions for extracting baseline content from respective advertisements. Furthermore, the memory 204 also includes logic/instructions for stitching disparate content together, to configure customized advertisements as will be explained in detail later.

In one embodiment, the memory 204 may also include one or more algorithms for predicting intentions of customers based on information collated corresponding to the customers. Some examples of intent prediction algorithms include models based on Artificial Neural Network (ANN), Support Vector Machine (SVM), Logistic Regression, and the like. The intent prediction algorithms may be used to predict an intention of each customer for accessing a web interface of the enterprise.

Further, the apparatus 200 is depicted to include an input/output module 206 (hereinafter referred to as 'I/O module 206') and at least one communication module such as the communication module 208. In an embodiment, the I/O module 206 may include mechanisms configured to receive inputs from and provide outputs to the user of the apparatus 200. The term 'user of the apparatus 200' as used herein refers to any individual or groups of individuals assigned with operating the apparatus 200 and configuring the apparatus 200 for facilitating dynamic optimization of content, such as Ad content, to be displayed to customers accessing the web interface. In an illustrative example, an enterprise may employ several data scientists, Machine Learning (ML) and/or Artificial Intelligence (AI) analysts, Information Technology (IT) professionals, scientists and researchers for configuring and operating the apparatus 200 embodied as an interaction platform. In an illustrative example, the I/O module 206 may enable the user of the apparatus 200 to define various workflow stages to facilitate dynamic optimization of advertisement content. To that effect, the I/O module 206 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like.

In an example embodiment, the processor 202 may include I/O circuitry configured to control at least some functions of one or more elements of the I/O module 206, such as, for example, a speaker, a microphone, a display, and/or the like. The processor 202 and/or the I/O circuitry may be configured to control one or more functions of the one or more elements of the I/O module 206 through computer program instructions, for example, software and/or firmware, stored on a memory, for example, the memory 204, and/or the like, accessible to the processor 202.

The communication module 208 is configured to facilitate communication of the apparatus 200 with one or more remote entities, such as one or more advertisement servers (or 'Ad servers') for receiving advertisement content therefrom. Further, the communication module 208 is configured to facilitate communication with a web server hosting the enterprise Web interaction channel (i.e. the Website or the mobile application displaying the web interface to the customers). To that effect, the communication module 208 includes communication circuitry such as for example, a transceiver circuitry including antenna and other communication media interfaces to connect to a wired and/or wireless communication network. The communication circuitry enables transmission of data signals and/or reception of signals from remote network entities, such as the web server hosting the enterprise website and/or the mobile application.

In one embodiment, the communication module 208 may include several channel interfaces to receive information from a plurality of enterprise interaction channels. Some non-exhaustive examples of the enterprise interaction channels may include a Web channel (i.e. an enterprise Website), a voice channel (i.e. voice-based customer support), a chat channel (i.e. chat support), a native mobile application channel, a social media channel, and the like. The channel interfaces are configured to receive up-to-date information related to the customer-enterprise interactions from the enterprise interaction channels. In some embodiments, the information may also be collated from the plurality of devices utilized by the customers. To that effect, the communication module 208 may be in operative communication with various customer touch points, such as electronic devices associated with the customers, websites visited by the customers, devices used by customer support representatives (for example, voice agents, chat agents, IVR systems, in-store agents, and the like) engaged by the customers and the like.

In an embodiment, various components of the apparatus 200, such as the processor 202, the memory 204, the I/O module 206 and the communication module 208 are configured to communicate with each other via or through a centralized circuit system 210. The centralized circuit system 210 may be various devices configured to, among other things, provide or enable communication between the components (202-208) of the apparatus 200. In certain embodiments, the centralized circuit system 210 may be a central printed circuit board (PCB) such as a motherboard, a main board, a system board, or a logic board. The centralized circuit system 210 may also, or alternatively, include other printed circuit assemblies (PCAs) or communication channel media.

It is noted that the apparatus 200 as illustrated and hereinafter described is merely illustrative of an apparatus that could benefit from embodiments of the invention and, therefore, should not be taken to limit the scope of the invention. It is noted that the apparatus 200 may include fewer or more components than those depicted in FIG. 2. In an embodiment, one or more components of the apparatus 200 may be deployed in a Web Server. In another embodiment, the apparatus 200 may be a standalone component in a remote machine connected to a communication network and capable of executing a set of instructions (sequential and/or otherwise) to facilitate dynamic optimization of content to be displayed to customers of an enterprise. Moreover, the apparatus 200 may be implemented as a centralized system, or, alternatively, the various components of the apparatus 200 may be deployed in a distributed manner while being operatively coupled to each other. In an embodiment, one or more functionalities of the apparatus 200 may also be embodied as a client within devices, such as customers' electronic devices. In another embodiment, the apparatus 200 may be a central system that is shared by or accessible to each of such devices.

In one embodiment, the apparatus 200 may be in operative communication with a datastore, such as a database 250. The apparatus 200 may include a storage interface (not shown in FIG. 2) as part of the communication module 208 to facilitate communication between the processor 202 and the database 250. Some examples of the storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 202 with access to content stored in the memory 204. It is noted that though the database 250 is depicted to be deployed external to the apparatus 200, in some embodiments, the database 250 may be included within the apparatus 200 and the processor 202, in such a scenario, may be configured to communicate with the database 250 using Application Programming Interface (API) calls. The database 250 is configured to store both raw and processed advertisement content as will be explained in further detail later. Further, the database 250 is also configured to store a plurality of content elements such as buttons (for example, buttons displaying text such as 'Click Here', 'Buy Now', etc.) and messages (for example 'Discount Offer', 'Cheap Deals', etc.), which may be used along with the processed advertisement content.

In at least one example embodiment, the processor 202 in conjunction with the instructions stored in the memory 204, is configured to cause the apparatus 200 to receive content such as static content advertisements (or banner advertisements), video advertisements, etc., from one or more Ad servers. As explained above, the communication module 208 of the apparatus 200 is in operative communication with content servers, such as Ad servers, and facilitates reception of content such as advertisements from the Ad servers. The advertisements received from the ad servers, also referred to unprocessed or 'raw' advertisements may be stored in the database 250. The processor 202 of the apparatus 200 may be configured to fetch an advertisement from the database 250 and generate a customized advertisement, as will be explained in detail hereinafter.

In one embodiment, the apparatus 200 may receive advertisements corresponding to several enterprises. For purposes of description, the enterprises wishing to display their ads on off-domain websites are referred to as 'advertisers', whereas the entity associated with the web interface (i.e. the UI associated with the off-domain website for example) is referred to as an 'enterprise', hereinafter. The advertisers may contract Ad agencies for generating creative advertisements, which are then stored in Ad servers. One or more advertisements corresponding to each advertiser may be provisioned to the apparatus 200 with criteria for display. For example, an advertiser may provide a criterion related to a display location (for example, on top banner, or rightmost corner of the display area of the web interface, etc.), a criterion related to frequency (for example, a maximum of five times and a minimum of one time in a day or any such daily/weekly/monthly/quarterly display target), and the like. The apparatus 200 may then choose when to display a particular ad and whom to display the ad for achieving the desired result (such as for example, a desired click-through rate etc.). More specifically, the apparatus 200 may choose the right content for a customer, optimize the content to generate a customized advertisement and cause display of the customized advertisement to the customer.

In one embodiment, the enterprise may offer Ad slots on the web interface for sale to a selling-side platform, which using an Ad exchange, may fetch a particular advertisement for each ad slot on a real-time basis. In such a scenario, the apparatus 200 may not need to identify the right advertisement for a customer and receive the advertisement directly from the Ad server. The apparatus 200 may optimize the advertisement to generate a customized advertisement and cause display of the customized advertisement to a customer. The receipt of an advertisement for each ad slot and subsequent optimization of the advertisement is explained later with reference to FIG. 5.

As explained above, in some scenarios, the apparatus 200 receives a plurality of ads corresponding to a plurality of advertisers from the Ad servers. The provisioning of an optimized ad content to customers in such a scenario is explained hereinafter.

In at least one example embodiment, the processor 202 in conjunction with the instructions stored in the memory 204, is configured to cause the apparatus 200 to extract baseline content from each advertisement. It is noted that all advertisements, typically, include some baseline content. For example, advertisements related to products on the E-commerce Website may include product images in few dimensions. Such images may include a baseline content, such as the actual image of the product, along with other related content, such as the image background, other objects, text content highlighting a new product feature, promotional content and the like. In some scenarios, enterprises may advertise their offerings using video and/or audio content. For example, a banking enterprise wishing to advertise housing loans may provide a video advertisement showing one or more houses with associated imagery, such as adjacent landscapes, children playing in the yard, sunrise backdrops and the like. In such a case, the actual content related to the housing loan offer may constitute the baseline content.

As explained, the memory 204 stores logic/instructions for detecting and extracting baseline content from each advertisement. The detection of baseline content may involve logic to compare position and size of objects identified in the ad with each other. For example, an image of an object in the center may be assigned more weightage and/or the image of an object with the largest size may be assigned more weightage as compared to other objects/content pieces in the advertisement, and the object(s) associated with highest weight may be determined as the main content or the baseline content for the respective advertisement. In some embodiments, the textual content in the ad may be normalized and provided to context-determining algorithms to determine a context of the ad, which may then be used to detect the baseline content in the advertisement. For example, words like 'RAM', 'Screen Size', 'Processor' etc., may imply that the advertisement corresponds to an electronic gadget and accordingly image content related to the electronic gadget from among other object images may be identified as the baseline content.

In at least one embodiment, the logic/instructions for extracting baseline content may include logic for tracing edges of detected baseline content, such as for example, edges of an image of a product to be advertised or an outline of an image of one or more individuals included in the advertisement. In some embodiments, the edges of the baseline image content may be identified based on pixel color transitions beyond a preset value, indicating a change in the associated object. The memory 204 may further include logic for storing only the information related to the content included within the traced edges to a separate location, thereby effectively extracting the baseline content from the advertisement content. The processor 202 is configured to use the logic/instructions in the memory 204 to detect and extract baseline content from each advertisement. The processor 202 is further configured to store the extracted baseline content corresponding to each advertisement in the database 250. It is noted the storing of baseline content extracted from each advertisement results in a storage of plurality of baseline contents in the database 250.

The content subsequent to the extraction of the baseline content from an advertisement, i.e. the remaining content, is referred to herein as 'non-baseline content' and may include content related to one or more other objects supporting the baseline content such as for example images of the one or more other objects. The non-baseline content may also include information such as edges, layouts and color schemes associated with the advertisement. In one embodiment, the non-baseline content may be linked with the extracted baseline content and stored in the database 250 along with the association with the baseline content.

In an illustrative example, from the image content provided by an advertiser, the processor 202 may be configured to extract the product image and store the product image as baseline content. Thereafter, the processor 202 may be configured to extract other objects, the edges separating the objects, the layout, dimensions of the individual objects, text and metadata associated with the text, layout, color scheme and the like, and store such information as non-baseline content.

In another illustrative example, for each video file provided by an advertiser, the processor 202 may be configured to detect baseline content and extract image frames, portions within individual frames related to the baseline content, etc., and store such information in the database 250 as baseline content. The remaining frames/objects and all the metadata related to the video advertisement may be stored by the processor 202 in the database 250 as non-baseline content. Similarly, for an audio file provided by an advertiser, the processor 202 may be configured to extract all the utterances related to the baseline content and store the utterances as well as the non-baseline content related utterances in the database 250.

In at least one example embodiment, the processor 202 is configured to receive information related to customer activity of each customer, who has accessed or is currently accessing the web interface. Accordingly, the customer activity may correspond to a current visit of the customer to the web interface and/or one or more previous visits of the customer to the web interface. For example, for a customer currently active on the web interface, information related to the customer, such as for example, IP address of the customer, current location co-ordinates, device type, device operating system (OS), device browser, and the like, may be retrieved by the processor 202 (for example, from the web server). In at least some embodiments, the IP address and/or the phone number may be indicative of a whether the customer is an existing customer or a new customer. For example, the processor 202 may be caused to compare the IP address with IP addresses corresponding to enterprise customers stored in the database 250 for a match. The processor 202 may be caused to identify the customer as an existing customer (or a customer, who has previously visited the interaction channel) if the IP address matches with a stored IP address in the database 250. If the customer is an existing customer, the processor 202 may be caused to retrieve historic interaction data, i.e. information related to one or more previous visits of the customer to the web interface.

In an illustrative example, content pieces such as images, hyperlinks, URLs, and the like, displayed on the web interface may be associated with Hypertext Markup Language (HTML) tags or JavaScript tags that are configured to be invoked upon user selection of tagged content. The information corresponding to the customer's activity on the web interface may then be captured by recording an invoking of the tags. The recorded information may be stored in a web server (i.e. a data gathering server) hosting the enterprise website associated with the web interface. In some embodiments, a socket connection may be implemented to capture all information related to the customer activity on the web interface. The captured customer activity on the web interface may include information such as web pages visited, time spent on each web page, menu options accessed, drop-down options selected or clicked, mouse movements, hypertext mark-up language (HTML) links those which are clicked and those which are not clicked, focus events (for example, events during which the customer has focused on a link/Web page for a more than a predetermined amount of time), non-focus events (for example, choices the customer did not make from information presented to the customer (for examples, products not selected) or non-viewed content derived from scroll history of the customer), touch events (for example, events involving a touch gesture on a touch-sensitive device such as a tablet), non-touch events and the like. In at least one example embodiment, the communication module 208 may be configured to receive such information from the web server logging information related to the customer activity on the web interface.

In addition to information related to the customer's activity on the enterprise interaction channel, the captured customer data may also include information such as the context of the content/ad, the device used for accessing the Website, the web browser and operating system associated with the customer device, the type of Internet connection (whether cellular or Wi-Fi), the IP address, the location co-ordinates, profile data (for example, name, address, contact details of the customer), and the like.

In at least one example embodiment, the processor 202 is configured to predict customer intent based on the information captured corresponding to the customer and the customer's activity on the web interface. The information captured corresponding to the customer and the customer's activity on the web interface is also referred to herein as customer intent data signals.

In an embodiment, the processor 202 may be configured to transform or convert customer intent data signals into a more meaningful or useful form. In an illustrative example, the transformation of customer intent data signals may include normalization of content included therein. In some embodiments, the processor 202 may also be configured to normalize customer keyword searches on the web interface, personal information such as phone numbers, email IDs etc. and so on. The processor 202 is further caused to extract features from the transformed data. The extracted features may include, but are not limited to, any combinations of word features such as n-grams, unigrams, bigrams and trigrams, word phrases, customer keyword searches, customer click data, customer web journeys, cross-channel journeys, the customer interaction history, and the like.

The extracted features from the transformed customer data are then be provided to at least one intent prediction algorithm to facilitate prediction of the at least one intention of customer. In an embodiment, an intention predicted for the customer corresponds to an outcome (such as for example a 'YES' or a 'No' outcome or even a 'High' or a 'Low' outcome) related to one of a propensity of the customer to engage in a chat interaction, a propensity of the customer to make a purchase on the web interface and a propensity of the customer to purchase a specific product displayed on the web interface. Further, in at least one example embodiment, the outcome may be associated with a likelihood measure. For example, an outcome of predicted propensity of the customer to perform an action, such as a purchase transaction, may be 'Yes' and may further associated with a likelihood measure of '0.85' indicative of an 85% likelihood of the customer performing the purchase transaction during the current journey.

In some embodiments, the processor 202 may also be configured to predict at least one persona of the customer using the information related to the customer activity. The term 'persona' refers to characteristics reflecting behavioral patterns, goals, motives and personal values of the customer. It is noted that 'personas' as used herein is distinct from the concept of user profiles, that are classically used in various kinds of analytics, where similar groups of customers are identified based on certain commonality in their attributes, which may not necessarily reflect behavioral similarity, or similarity in goals and motives. An example of a customer persona type may be a 'convenience customer' that corresponds to a group of customers characterized by the behavioral trait that they are focused and are looking for expeditious delivery of service. In one embodiment, the user of the apparatus 200 may be configured to define a plurality of feature vectors corresponding to behavioral attributes for each persona type. Similarly, feature vectors may be configured from information related to the tracked customer activity as well as the collated customer data. The feature vectors may then be compared to predict the persona of the customer. Some non-limiting examples of metrics used to compare the feature vectors may include distance measuring metrics like cosine similarity, Manhattan distance, Euclidean distance, and the like. Using such metrics, the feature vector representing the persona of each customer is compared with vector values of predefined clusters.

As explained above, various types of information may be collated corresponding to each customer visiting the web interface. In one embodiment, the processor 202 may be configured to treat various tracked and/or derived information types as 'attributes' associated with the customer. For example, a current location of the customer may configure one attribute associated with the customer. Similarly, weather information derived based on the current location (for example, by fetching weather data from a weather application using an API Call) may configure another attribute associated with the customer. In an embodiment, a device type of an electronic device used by the customer (for example, a smartphone, a tablet, a laptop, a desktop computer, etc.) for accessing the Web interface, a web browser and an Operating System (OS) associated with the electronic device, etc. may also configure attributes associated with the customer. In some embodiments, an age of the customer and a gender of the customer (or any such information provided by the customer or gleaned from previous customer visits or guessed from customer activity) may be used as attributes. Furthermore, the predicted intention and/or persona may also configure attributes associated with the customer. Accordingly, a plurality of attributes may be identified corresponding to a plurality of customers.

In one embodiment, the processor 202 of the apparatus 200 may be configured to generate a mapping linking each attribute to one or more baseline contents and one or more content elements stored in the database 250. In at least some embodiments, the processor 202 is configured to utilize machine learning and other artificial algorithms (AI) to link customer attribute with baseline content and content elements. In an illustrative example, it is observed that a middle-aged female customer may be more likely to purchase a facial product associated with ageing, whereas a middle-aged man may be more likely to purchase a hair care related product. Accordingly, age or gender attribute may be mapped to specific baseline contents and content elements, which are more likely to be relevant to the respective attributes. In another illustrative example, a customer using a laptop or a phone of a particular brand may most likely purchase accessories which are related to the laptop/phone brand. Accordingly, the attribute related to the device type may be linked to specific baseline contents and content elements, which are more likely to relevant to the respective attribute, and so on and so forth. In one embodiment, the processor 202 may be configured to store the mapping in the database 250.

In at least one example embodiment, the processor 202 is configured to detect presence of a customer on a web interface associated with an enterprise. For example, the processor 202 may detect the presence of the customer on an enterprise website, or in other words, detect a customer browsing event. In an illustrative example, a request for accessing a web page associated with the website may be received at a web server hosting the website. For example, a customer may enter a uniform resource locator (URL) associated with the web page in a web browser application to provision a hypertext transfer protocol (HTTP) request to the web server for web page access. In response to the HTTP request, the web server may be configured to provision the web page to the customer's electronic device, which may then display the web page in the UI associated with the web browser application. It is noted that the UI of the web page configures the web interface associated with the enterprise. The provisioning of the web interface (i.e. web page(s)) may be recorded at the web server. As explained above, the communication module 208 of the apparatus 200 is in operative communication with the web servers and other data gathering servers. The communication module 208 may receive notification of the customer's request and subsequent provisioning of the web page from the web server and thereby detect presence of the customer on the web interface.

In another illustrative example, an invoking of a native mobile application related with the enterprise may trigger an Application Programming Interface (API) call to the apparatus 200. As explained above, the communication module 208 is in operative communication with personal devices of the customers. The communication module 208 may receive the API call from the customer's electronic device. The apparatus 200 may be caused to detect the presence of the customer in the native mobile application channel in response to the reception of the API call. The apparatus 200 may similarly track presence of customers in other web interfaces, such as those related to the social media channel, and the like.

Subsequent to the detection of the customer's presence on the web interface, in at least one embodiment, the processor 202 in conjunction with the instructions stored in the memory 204, is configured to cause the apparatus 200 to determine at least one attribute associated with a customer. The attribute may be determined based on tracked customer activity on the web interface as explained above. Further, the processor 202 may be configured to access plurality of baseline contents and a plurality of content elements stored in the database 250 and select at least one baseline content and at least one content element based on the attributes associated with the customer. More specifically, the processor 202 may be configured to determine all possible content elements, which may be utilized for specific customer intent data signals and other data signals such as weather, location, device, gender, browser, CRM data signals (products owned, existing customer or prospect), and the like. As explained above, the processor 202 is configured to utilize machine learning and other artificial algorithms (AI) to map customer attributes with baseline content(s) and content elements. Accordingly, once one or more attributes of a customer are determined, the processor 202 is configured to select relevant baseline content and other content elements from among the stored content in the database 250.

It is noted that in some cases, the customer may be a first-time visitor to the web interface, or, the customer's activity on the web interface for the current journey may not include enough information related to web pages accessed or events triggered on the web pages. In such cases, information such as user's location, device identifiers and the like, may facilitate intent prediction. In an illustrative example, from the device's IP address and other metadata, a customer's location co-ordinates may be identified. The location identification may enable deducing information like current weather (for example, whether it is raining or whether it is too hot), current local trends (for example, whether a local festival is currently underway), regional preferences, and the like. So, for example, from the location co-ordinates if it is deduced that the current weather includes rainfall, then baseline content, such as an image related to hot beverage such as coffee, along with associated buttons and messages may be retrieved. Similarly, if the customer's electronic device is a high-end Android® phone, then it may be deduced that the customer may most likely be not interested in iOS® products and accordingly baseline content, buttons and messages of non-iOS products may be retrieved. In yet another illustrative example, from the location co-ordinates if it is deduced that a local festival is underway, then content pieces related to apparel and other accessories related to the festival may be retrieved. As explained above, in some cases, the customer intent data signals may include only information related to customer location, device identifiers, local weather information, and the like. Such customer intent data signals, in absence of past customer interaction history or current activity information, may serve to facilitate retrieval of relevant baseline content and other content elements.

Subsequent to selecting baseline content and at least one content element, in at least one example embodiment, the processor 202 is configured to determine an optimum size and a layout configuration from a plurality of layout configurations for displaying the selected baseline content and the at least one content element. In an illustrative example, the processor 202 may be configured to take into account a size/shape of the ad slot, a background of the web interface or a color scheme of content adjoining the ad slot to determine an optimum size and layout of combinations of baseline content, buttons and messages.

In one embodiment, the processor 202 of the apparatus 200 is configured to stitch the baseline content and at least one content element based on the optimum size and the layout configuration to generate the customized advertisement for the customer. As explained, the memory 204 may include logic/instructions for stitching (i.e. digitally combining) the content together. In at least some embodiments, the stitching process may involve overlaying content to be stitched side-by-side and fusing an edge portion of the content pieces using digital means to generate the customized advertisement.

In an illustrative example, an E-commerce entity (i.e. advertiser) may have several baseline product images and personalized data elements, which could be mapped to a variety of customer intents and, moreover, different audience segments might show affinity to keywords like "Deep Discount", "Cool offer", "Cheap Deal" etc. In such situations adding these variations of text along with the baseline product images for different variations of the dimensions for content/Ads may create challenges in text alignment, white space, aspect ratio, orientation, background color themes, layouts to be used. The processor 202 may be configured to utilize the metadata associated with the content elements and the baseline content to map them with the appropriate customer attribute such as customer intent and stitch them together to form the resultant customized/personalized content which may then be distributed on the Website, applications and outbound digital marketing content/Ads. In at least some embodiments, the processor 202 of the apparatus 200 is configured to cause display of the customized advertisement on a display area associated with the web interface. It is noted that the term 'display area associated with the web interface' implies a total UI space afforded for display of enterprise content on a display screen of the customer's electronic device.

As explained above, in some embodiments, the raw advertisement provided by the advertiser may correspond to a video Ad (for example, a video clip). In such a case, the extraction of baseline content may involve extraction of one or more image frames including content related to a product or a service to be advertised. Further, the processor 202 may be configured to perform at least one of: (1) reordering of image frames associated with the video advertisement based on the attributes of the customer; (2) inserting one or more objects of customer interest in the video advertisement; and (3) removing at least one image frame or at least one image frame object of no interest to the customer from the video advertisement, for generating the customized advertisement. It is noted that the term 'customer interest' as used herein, in at least some embodiments, may be linked to the customer's predicted intention. For example, if it is predicted that the customer is interested in purchasing a Digital Single-Lens Reflex (DSLR) camera, then image frame objects related to other electronic gadgets such as images of smartphones for instance, may be considered of 'no interest' to the customer. On the other hand, content related to images of various DSLR camera models or their accessories, may be considered to be of customer interest for a customer, whose intent is identified to be a purchase of a camera.

An example generation of generation of optimized content in form of a customized advertisement is explained next with reference to FIGS. 3A, 3B and 3C.

Figure 3A:
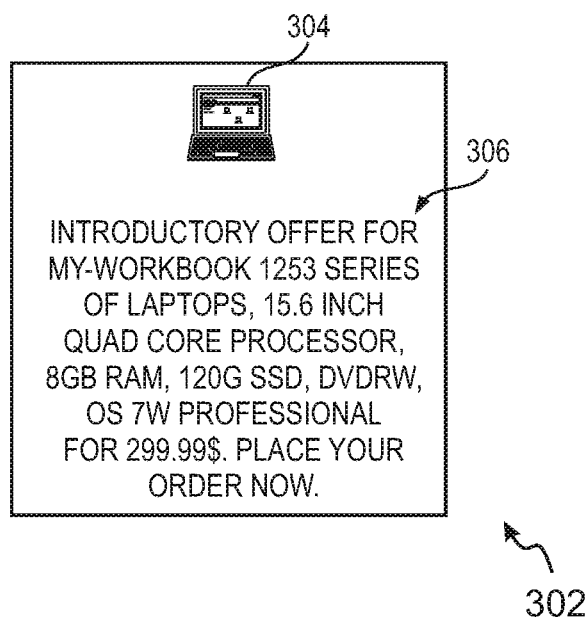
FIG. 3A shows an example advertisement received by the apparatus of FIG. 2 from an Ad server, in accordance with an embodiment of the invention.

FIG. 3A shows an example advertisement 302 received by the apparatus 200 of FIG. 2 from an Ad server, in accordance with an embodiment of the invention. The advertisement 302 intended to be displayed to one or more customers visiting a web interface associated with the enterprise is depicted to include an image 304 of a laptop offered for sale by an enterprise ABC. Further, the advertisement 302 is depicted to include textual content 306. The textual content 306 is depicted to display text 'INTRODUCTORY OFFER FOR MY-WORKBOOK 1253 SERIES OF LAPTOPS, 15.6-INCH QUAD CORE PROCESSOR, 8G RAM, 120G SSD, DVDRW, OS 7 W PROFESSIONAL FOR 299.99$'.

The advertisements, such as the advertisement 302, are designed to attract a customer's attention and their primary aim is to persuade the customer to click on the advertisements so that the customer can then be displayed product specifications along with other details, such as for example delivery options, EMI options, etc., for facilitating purchase of the laptop.

However, as can be seen, the image 304 of the laptop is a thumbnail image and, as such, the size of the image 304 is not optimized for display on the web interface. Moreover, the textual content 306 is also not personalized for a viewer to attract the viewer's attention. Such an advertisement 302 if displayed to the customer in an 'as-is' form (i.e. a current form as displayed in FIG. 3A) may fail to attract the customer's attention and the customer may not click on the advertisement 302, thereby a primary objective of the advertisement may not be achieved. Accordingly, the apparatus 200 may dynamically optimize the advertisement 302 for customer display purposes. The dynamic optimization of the advertisement 302 is further explained with reference to FIG. 3B.

Figure 3B:
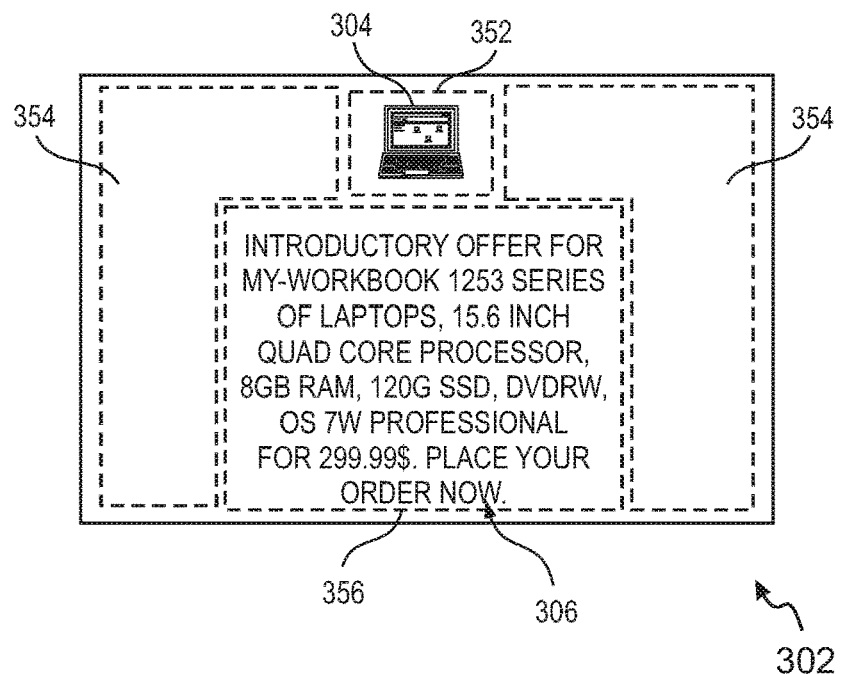
FIG. 3B shows a representation of the advertisement of FIG. 3A for illustrating an extraction of baseline content for generating a customized advertisement, in accordance with an embodiment of the invention.

FIG. 3B shows a representation of the advertisement 302 of FIG. 3A for illustrating an extraction of baseline content for generating a customized advertisement, in accordance with an embodiment of the invention. As explained with reference to FIG. 2, the processor 202 of the apparatus 200 may use logic/instructions stored in the memory 204 to detect baseline content in the advertisement 302. In an example scenario, the processor 202 may determine the image 304 as the baseline content. Further, the processor 202 may use logic/instructions stored in the memory 204 to extricate a portion 352 from the advertisement 302 to extract the baseline content. The extracted baseline content may then be stored in the database 250 (shown in FIG. 2).

It is noted that remaining content as displayed marked by dotted portions 354 (corresponding to a background of the image 304) and a dotted portion 356 including the textual content 306 is stored as non-baseline content in the database 250.

In an example scenario, attributes determined for a customer currently active on the web interface may indicate that an advertisement, such as the advertisement 302, is relevant for the customer. In an illustrative example, the customer may have clicked on images of laptops and also indicated a preference for a low-cost purchase of the laptop. In such a case, the processor 202 may select the extracted baseline content (i.e. the image 304) and identify at least one content element relevant for the customer to personalize the advertisement. Further, the processor 202 may also determine the optimum size and layout configuration for displaying the selected baseline content and the content element(s). The processor 202 may then be configured to stitch the various content elements to generate a customized advertisement. An example customized advertisement generated based on the advertisement 302 is shown in FIG. 3C.

Figure 3C:
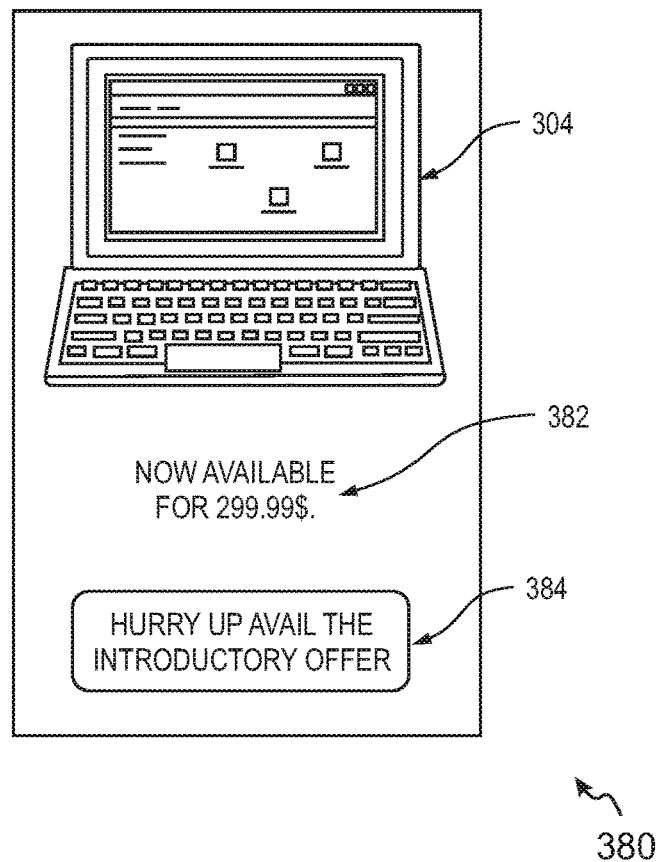
FIG. 3C shows an example representation of a customized advertisement displayed to a customer, in accordance with an embodiment of the invention.

FIG. 3C shows an example representation of a customized advertisement 380 displayed to a customer, in accordance with an embodiment of the invention. The advertisement 380 depicted in FIG. 3C is an optimized version of the advertisement 302 shown in FIG. 3A. As explained with reference to FIG. 3A, the advertisement 302 includes a thumbnail size image (i.e. image 304) of the laptop, which is quite small as compared to the overall ad-space. Moreover, the textual content 306 in the advertisement may overwhelm the customer and the customer may choose to ignore the advertisement.

Accordingly, the processor 202 may be configured extract baseline content, such as the image 304 of the laptop, along with other content elements, such as the textual content 306 from the advertisement 302 provided by the enterprise. Further, the processor 202 may be configured to map the baseline content and the content elements with matching customer attributes, such as for example, customer's activity. Such a relationship may be stored in the database 250 (shown in FIG. 2).

As explained with reference to FIG. 3B, a customer accessing the web interface may have clicked on images of laptops and especially on content offering deals and discounts. The activity of the customer may be tracked and the customer intent predicted based on the tracked activity.

Accordingly, the apparatus 200 may be configured to retrieve baseline content (i.e. image 304) and content elements such as a message 382 and a button 384 based on the determined customer attributes. The apparatus 200 may further be configured to optimize the size and layout of the content and stitch together the individual personalized content pieces to generate the optimized advertisement 380.

The advertisement 302, as shown in FIG. 3A, includes a lot of whitespace. When a product image, such as the laptop image is put into an Ad of size 300×250 (in pixel unit) or 160×600 (in pixel unit), the product appears to be much smaller as a lot of space gets wasted in the white space. The processor 202 is configured to remove this unwanted whitespace automatically using edge detection so that the actual product appears much bigger when shown inside personalized content/Advertisement. As can be seen, the optimized advertisement 380 shows an enlarged image of the laptop 302 as opposed to the smaller thumbnail size laptop image displayed in the advertisement 302 (shown in FIG. 3A).

Moreover, the textual content 306 is now optimized to highlight the text 'Now Available for only $299' as shown in the message 382 and the button 384 stating 'Hurry Up! Avail the Introductory Offer' is now included in the customized advertisement 380. Such content is optimized to suit the customer's intent to buy laptop at a good discount and this may drastically increase the possibility of the customer clicking on the advertisement 380 to explore the offer further.

It is noted that E-commerce Websites generally include a catalog of several hundreds of images and using the conventional approach, each ad-content may have to be individually optimized, which may not be feasible. However, the dynamic optimization of the ad-content based on customer intent data signals as explained herein provides on-the-fly optimization of many content pieces displayed to the customer and the customer is more likely to click and purchase a product or a service if offered such optimized ad-content.

It is noted that the optimization is not restricted to the examples explained above. Some other illustrative examples follow:

In some cases, the images may have distorted product orientation. More specifically, some of the images may not be aligned well (i.e. the images may be associated with an inclination) and do not fit well with the creative. The processor 202 may be configured to detect such cases and put relevant optimizations to make the product well aligned providing better fit for the content space.

In another illustrative example, a product image may not look crisp due to similar background color. In such a case, the processor 202 may be configured to modify the background color of the product in such a way that it has better contrast with the product and the product stands out better. In some embodiments, the processor 202 may be configured to enhance the contrast of the product so that the overall image quality improves.

It is noted that optimization of Ad-content is not restricted to image/text related Ad-content. The apparatus 200 is configured to optimize multimedia content, such as video content, for improving the click-through rate of advertisements. An example optimization of video content is explained with reference to FIG. 4.

Figure 4:
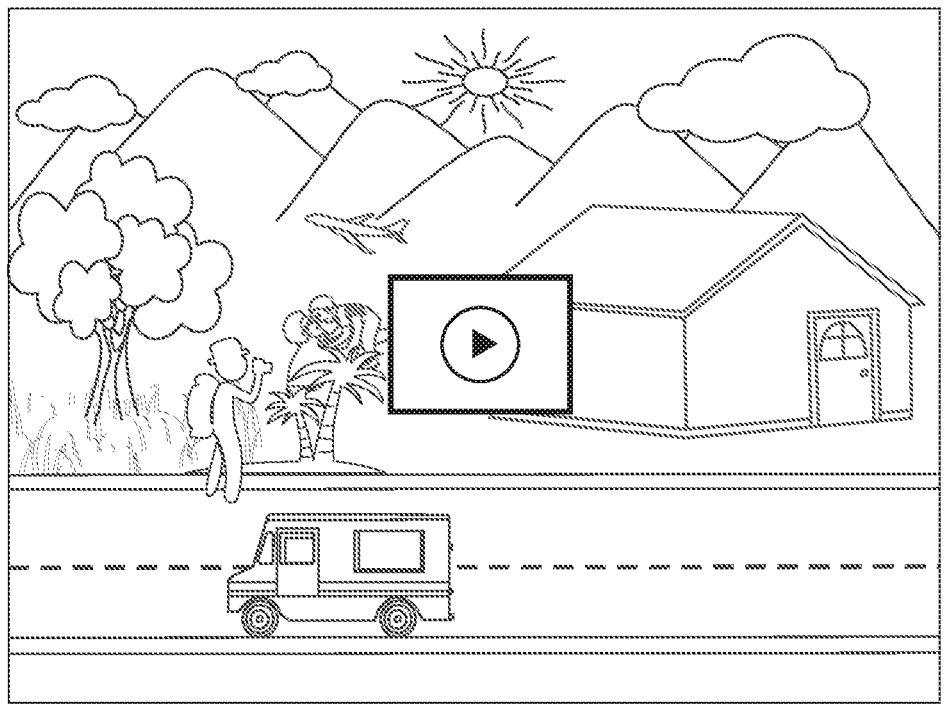
FIG. 4 shows an example representation of a starting image frame of a video advertisement, in accordance with an embodiment of the invention.

FIG. 4 shows an example representation of a starting image frame 400 of a video advertisement, in accordance with an embodiment of the invention. The video advertisement corresponds to a mortgage loan ad and includes several images of houses in various dimensions. Further, the image frames may display content such as a view of nearby forest, a shopping street nearby, sun shining above the house or snow falling on the house, etc. In an embodiment, the apparatus 200 may be configured to extract frames, such as image frame 400 along with other image frame showing houses as baseline content in the database 250 (shown in FIG. 2). Further, content remaining subsequent to the extraction of the baseline content is also stored as non-baseline content in the database 250.

For a customer accessing the web interface, the individual attributes of the customer, such as a customer location (for example, the customer may belong to a region where it snows often), the customer's individual choices (for example choices like quite neighborhood, color of the house, or desired proximity to shopping areas etc. gleaned from current or previous customer activity on the web interface) etc. may be used to identify the right images of houses and associated objects. Accordingly, image frames within the video content may be deleted or added to provide the optimized video content to the customer.

In another illustrative example, for a video Ad-content associated with an advertiser selling home and garden equipment, if a desired piece of equipment for a customer is being displayed at a later point in time, then the customer may lose interest and may not view the video content in its entirety. The processor 202 may be configured to reorder image frames, insert objects of choice, etc., within the video content in order to make the Ad-content relevant for the customer, thereby improving the chances of the customer engaging in a purchase transaction during the current journey on the web interface. In some other embodiments, the processor 202 may also be configured to recreate specific frames with the images/text that are expected to work better for the customer followed by attaching the relevant audio that goes well with the content.

Once the final personalized content is created, the processor 202 of the apparatus 200 may be configured to cause display of the advertisement on various digital channels such as the off-domain enterprise web interface, third-party applications, and the like. Moreover, a time-series of all the exposure may be maintained at the customer level.

The provisioning of optimized content is so far explained for Ad-content, which is stored in a database 250 and optimized on-the-fly for customer viewing purposes. However, as explained with reference to FIG. 2, in some embodiments, the enterprise may offer the ad slots on the web interface for sale to a selling-side platform (SSP), which using an ad exchange, may fetch a particular advertisement for each ad slot on a real-time basis. The receipt of ads for filling out ad slots in real-time is explained below.

In an illustrative example, the web interface of the enterprise may include JavaScript (JS) embedded in the content displayed therein. When an access request for a web page of the web interface is received from a customer, the JS associated with the web page is configured to send a request to a Supply-Side Platform (SSP). It is noted that the SSP is a technology platform with which web interfaces (also referred to as Ad publishers), can make available their inventory (i.e. the advertisement slots) to a large number of potential buyers. The SSP also enables the Ad publishers to set criteria on which advertisers can or cannot purchase their inventory and set the minimum prices for which their inventory can be sold to certain buyers. When a JS request is received by the SSP, it in turn, is configured to send the request to an Ad exchange. An Ad exchange is a trading platform that enables advertisers and publishers to buy and sell advertising space. In response to the receipt of request, the Ad Exchange is configured to request bids from multiple demand-side platforms (DSPs). It is noted that the Ad exchange may request bids from multiple DSPs. It is understood that a DSP is a system that allows buyers of digital advertising inventory (i.e. the advertisers) to manage multiple ad exchanges and set Ad display preferences through a single interface. The Ad exchange passes information related to the Ad publisher, such as the Web URL, IP address, etc. to the DSPs. Each DSP will now match an advertiser from its database to the obtained publisher from the Ad exchange. This is done using algorithms involving machine learning, contextual data, natural language processing (NLP), and the like. Thereafter, each DSP creates a bid response including the bid amount, the advertiser information, the advertiser JS tag, etc., and sends the bid response to the Ad exchange.

In an example scenario, if DSP 'A' found enterprise ABC to be the best match for the information related to the web interface and provisioned a bid on behalf of enterprise ABC to the Ad Exchange. After receiving the bids from all the DSPs, the Ad exchange 130 performs a real-time bidding (RTB) auction and chooses the DSP with the highest bid. In an example scenario, the bid response from enterprise ABC may be the highest bid and accordingly, the Ad exchange may select enterprise ABC as the advertiser for a slot on the web interface. It is noted that the highest bidder (i.e. enterprise ABC) pays an amount equal to the second highest bid as per second-price auction scheme. The Ad exchange informs the DSP 'A' of the selection of its bid and the DSP 'A', in turn, and sends the response to the Ad publisher (i.e. the website 108).

The web interface using the advertiser JS tag in the response, calls the advertiser Ad server asking for the advertisement, such as the advertisement 302 shown in FIG. 3A. It is noted the Ad server stores advertisements associated with the enterprise ABC. The Ad server may provision the advertisement to the apparatus 200 for subsequent display on a display area associated with the web interface. In such a scenario, the apparatus 200 may not need to identify the right ad for a customer and receive the advertisement directly from the Ad server. The apparatus 200 may optimize the advertisement to generate a customized ad and cause display of the customized advertisement to a customer. The optimization of the advertisement in such a scenario is explained with reference to FIG. 5.

Figure 5:
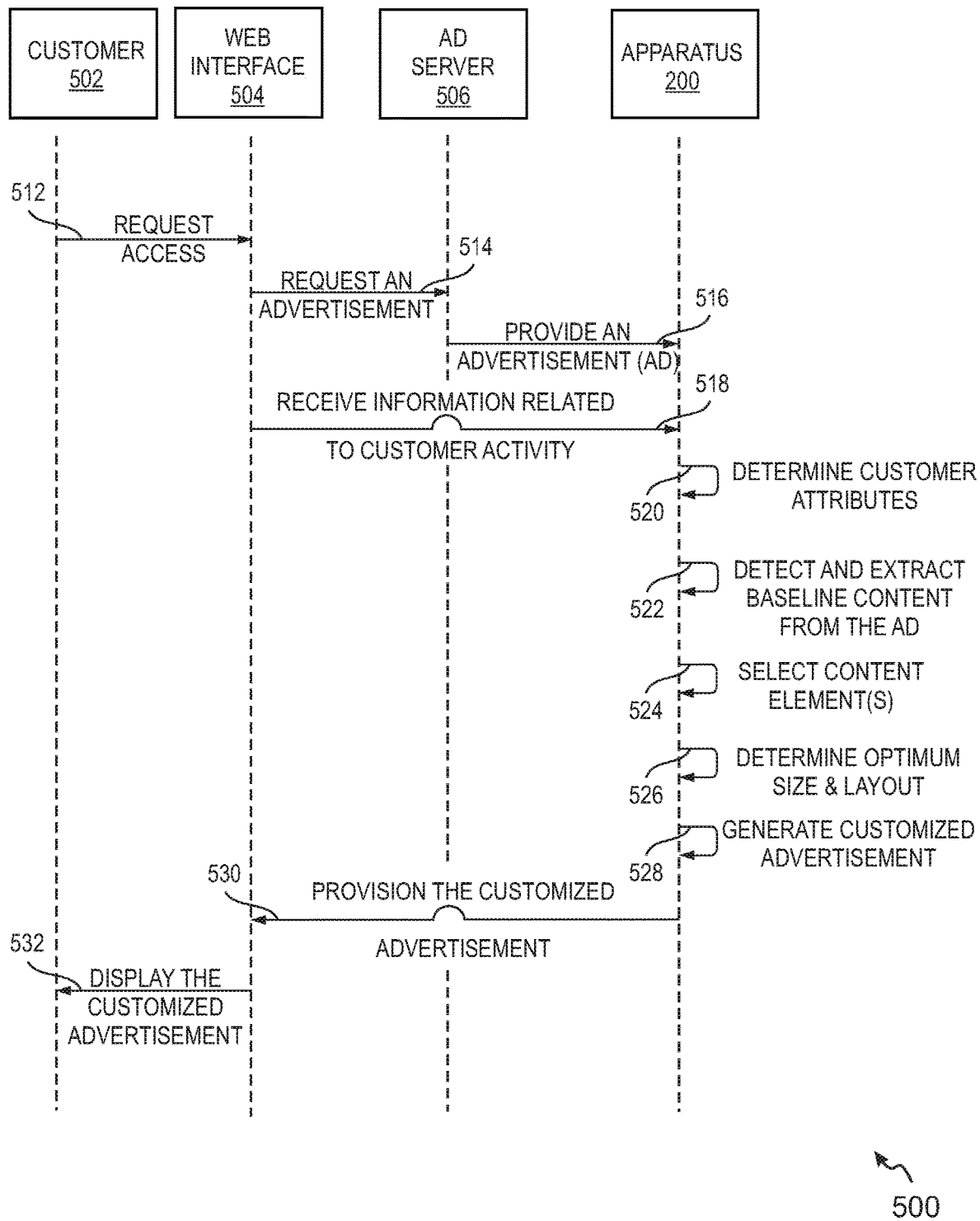
FIG. 5 shows a sequence flow diagram for illustrating a process flow associated with provisioning of an optimized advertisement to a customer, in accordance with an embodiment of the invention.

FIG. 5 shows a sequence flow diagram for illustrating a process flow 500 associated with provisioning of an optimized advertisement to a customer, in accordance with an embodiment of the invention. The process flow 500 starts at 512.

At 512 of the process flow 500, a customer 502 requests access to a web interface 504. The customer 502 may request access to a web interface over a communication network, such as the Internet, by using a web browser application installed in the customer's electronic device.

At 514 of the process flow 500, the web interface 504 requests an Ad server 506 to provide an advertisement for an Ad slot on a UI of the web page (i.e. on the web interface 504). It is noted that the appropriate Ad server is identified using intercommunication between the web interface, SSP, DSP and the Ad Exchange explained above.

At 516 of the process flow 500, the Ad server 506 identifies the advertisement to be displayed to the customer 502 and provides the advertisement to the apparatus 200 (explained with reference to FIGS. 2 to 4) for dynamic optimization of the advertisement.

At 518 of the process flow 500, the apparatus 200 receives information related to customer activity on the web interface 504. It is noted that though the information is depicted to be received from the web interface 504, it is understood that the information related to customer activity may be received from web server associated with the web interface 504 and configured to log customer activity on the web interface 504.

At 520 of the process flow 500, the apparatus 200 determines customer attributes from the information related to the customer activity.

It is noted that, in some embodiments, the steps 514 and 518 may be performed substantially simultaneously.

At 522 of the process flow 500, the apparatus 200 detects and extracts baseline content from the advertisement.

At 524 of the process flow 500, the apparatus 200 selects one or more content elements based on the customer attributes. As explained with reference to FIGS. 2 to 3C, the content elements may include personalized messages, personalized buttons, and the like.

At 526 of the process flow 500, the apparatus 200 determines an optimum size and layout configuration for displaying the baseline content and the selected one or more content elements.

At 528 of the process flow 500, the apparatus 200 generates a customized advertisement by stitching the baseline content and the one or more content elements based on the determination of the optimum size and layout configuration.

At 530 of the process flow 500, the apparatus 200 provisions the customized advertisement to the web interface 504.

At 532 of the process flow 500, the apparatus 200 displays the customized advertisement on the web interface 504 in response to the customer's request for access to the web interface 504.

The process flow 500 ends at 532.

Figure 6:
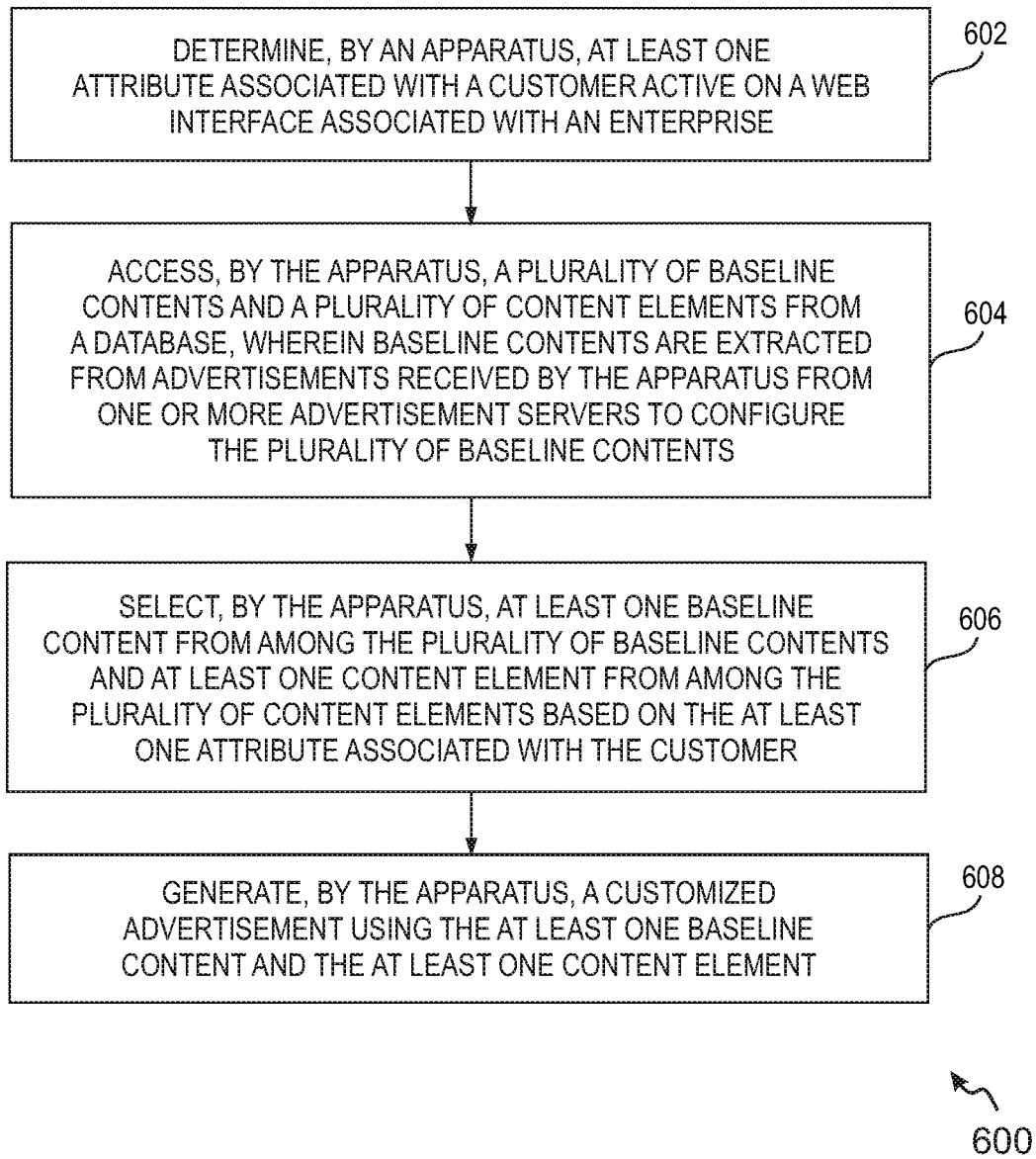
FIG. 6 is a flow diagram of an example method for provisioning optimized content to a customer, in accordance with an embodiment of the invention.

FIG. 6 is a flow diagram of an example method 600 for provisioning optimized content to a customer, in accordance with an embodiment of the invention. The method 600 depicted in the flow diagram may be executed by, for example, the apparatus 200 explained with reference to FIGS. 2 to 5. Operations of the flowchart, and combinations of operation in the flowchart, may be implemented by, for example, hardware, firmware, a processor, circuitry and/or a different device associated with the execution of software that includes one or more computer program instructions. The operations of the method 600 are described herein with help of the apparatus 200. It is noted that, the operations of the method 600 can be described and/or practiced by using a system other than the apparatus 200. The method 600 starts at operation 602.

At operation 602 of the method 600, at least one attribute associated with a customer active on a Web interface associated with an enterprise is determined by an apparatus, such as the apparatus 200 explained with reference to FIGS. 2 to 5. The attribute may be determined based on tracked customer activity on the web interface as explained with reference to FIG. 2. For example, for a customer currently active on the web interface, information related to the customer, such as for example, IP address of the customer, current location co-ordinates, device type, device operating system (OS), device browser, and the like, may be retrieved by the apparatus (for example, from the web server logging customer information). In at least some embodiments, the IP address and/or the phone number may be indicative of a whether the customer is an existing customer or a new customer. For example, the apparatus may be caused to compare the IP address with IP addresses corresponding to enterprise customers stored in a database, such as the database 250 shown in FIG. 2, for a match. The apparatus may be caused to identify the customer as an existing customer (or a customer, who has previously visited the interaction channel) if the IP address matches with a stored IP address in the database. If the customer is an existing customer, the apparatus may be caused to retrieve historic interaction data, i.e. information related to one or more previous visits of the customer to the web interface.

Accordingly, various types of information may be collated corresponding to each customer visiting the web interface. In one embodiment, the processor 20 may be configured to treat various tracked and/or derived information types as attributes associated with the customer. For example, a current location of the customer may configure one attribute associated with the customer. Similarly, weather information derived based on the current location (for example, by fetching weather data from a weather application using an API Call) may configure another attribute associated with the customer. In an embodiment, a device type of an electronic device used by the customer (for example, a smartphone, a tablet, a laptop, a desktop computer, etc.) for accessing the Web interface, a web browser and an Operating System (OS) associated with the electronic device, etc. may also configure attributes associated with the customer. In some embodiments, an age of the customer and a gender of the customer (or any such information provided by the customer or gleaned from previous customer visits or guessed from customer activity) may be used as attributes. Furthermore, the predicted intention and/or persona may also configure attributes associated with the customer.

At operation 604 of the method 600, a plurality of baseline contents and a plurality of content elements are accessed from the database. The baseline contents are extracted from advertisements received by the apparatus from one or more advertisement (Ad) servers to configure the plurality of baseline contents. As explained with reference to FIG. 2, the apparatus receives a plurality of advertisements corresponding to a plurality of advertisers from the Ad servers. The apparatus further stores logic/instructions for detecting and extracting baseline content from each advertisement. The detection and extraction of the baseline content may be performed as explained with reference to FIGS. 2 to 3C. The extracted baseline content corresponding to each advertisement is stored in the database. It is noted the storing of baseline content extracted from each advertisement results in a storage of plurality of baseline contents in the database. Further, the database is also configured to store a plurality of content elements such as buttons (for example, buttons displaying text such as 'Click Here', 'Buy Now', etc.) and messages (for example 'Discount Offer', 'Cheap Deals', etc.), which may be used along with the processed advertisement content.

At operation 606 of the method 600, selection of at least one baseline content from among the plurality of baseline contents and at least one content element from among the plurality of content elements is performed by the apparatus based on the at least one attribute associated with the customer. As explained with reference to FIG. 2, the apparatus is configured to utilize machine learning and other artificial algorithms (AI) to map customer attributes with baseline content and content elements. Accordingly, once one or more attributes of a customer are determined, the apparatus is configured to select relevant baseline content and other content elements from among the stored content in the database.

At operation 608 of the method 600, a customized advertisement is generated by the apparatus using the at least one baseline content and the at least one content element. In one embodiment, subsequent to selecting baseline content and at least one content element, the apparatus is configured to determine an optimized size and a layout configuration from a plurality of layout configurations for displaying the selected baseline content and the at least one content element. In an illustrative example, the apparatus may be configured to take into account a size/shape of the ad slot, a background of the web interface or a color scheme of content adjoining the ad slot to determine an optimum size and layout of combinations of baseline content, buttons and messages. Further, the apparatus may be configured to stitch the baseline content and at least one content element based on the optimum size and the layout configuration to generate the customized advertisement for the customer. As explained with reference to FIG. 2, the apparatus may include logic/ instructions for stitching of content together. In at least some embodiments, the stitching process may involve overlaying content to be stitched side-by-side and fusing an edge portion of the content pieces using digital means to generate the customized advertisement. In at least some embodiments, the apparatus may be configured to cause display of the customized advertisement on a display area associated with the web interface.

Figure 7:
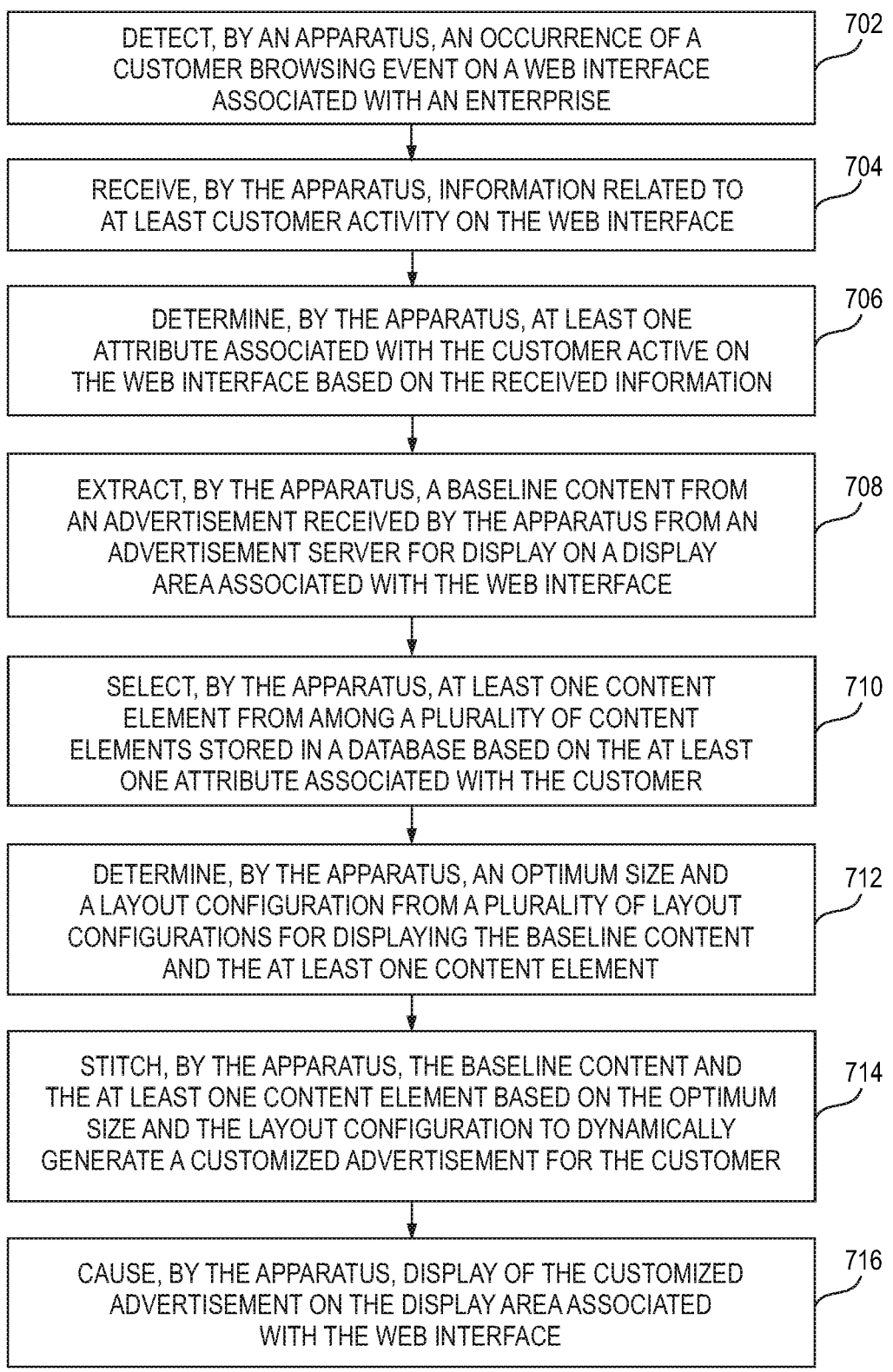
FIG. 7 is a flow diagram of an example method for provisioning optimized content to a customer, in accordance with another embodiment of the invention.

FIG. 7 is a flow diagram of an example method 700 for provisioning optimized content to a customer, in accordance with another embodiment of the invention. The method 700 depicted in the flow diagram may be executed by, for example, the apparatus 200 explained with reference to FIGS. 2 to 5. Operations of the flowchart, and combinations of operation in the flowchart, may be implemented by, for example, hardware, firmware, a processor, circuitry and/or a different device associated with the execution of software that includes one or more computer program instructions. The method 700 starts at operation 702.

At operation 702 of the method 700, an occurrence of a customer browsing event on a web interface associated with an enterprise is detected by an apparatus, such as the apparatus 200. The detection of the occurrence of a customer browsing event may be performed as explained with reference to FIG. 2.

At operation 704 of the method 700, information related to at least customer activity on the web interface is received. In an illustrative example, content pieces such as images, hyperlinks, URLs, and the like, displayed on the web interface may be associated with Hypertext Markup Language (HTML) tags or JavaScript tags that are configured to be invoked upon user selection of tagged content. The information corresponding to the customer's activity on the web interface may then be captured by recording an invoking of the tags. The recorded information may be stored in a web server (i.e. a data gathering server) hosting the enterprise website associated with the web interface. In some embodiments, a socket connection may be implemented to capture all information related to the customer activity on the web interface. The captured customer activity on the web interface may include information such as web pages visited, time spent on each web page, menu options accessed, drop-down options selected or clicked, mouse movements, hypertext mark-up language (HTML) links those which are clicked and those which are not clicked, focus events (for example, events during which the customer has focused on a link/Web page for a more than a predetermined amount of time), non-focus events (for example, choices the customer did not make from information presented to the customer (for examples, products not selected) or non-viewed content derived from scroll history of the customer), touch events (for example, events involving a touch gesture on a touch-sensitive device such as a tablet), non-touch events and the like. In at least one example embodiment, the apparatus may be configured to receive such information from the web server logging information related to the customer activity on the web interface. In an embodiment, in addition to the information related to the customer activity, information related to customer device used for accessing the web interface, historical browsing data of the customer and profile data of the customer is also received.

At operation 706 of the method 700, at least one attribute associated with the customer active on the web interface based on the received information is determined by the apparatus. At operation 708 of the method 700, a baseline content is extracted from an advertisement by an apparatus. The advertisement is received by the apparatus from an advertisement server for display on a display area associated with the web interface. At operation 710 of the method 700, at least one content element from among a plurality of content elements stored in a database is selected by the apparatus based on the at least one attribute associated with the customer. The determination of the customer attributes, extraction of the baseline content and the selection of the at least one content element may be performed as explained with reference to operation 602, 604 and 606 of the method 600 and is not explained again herein.

At operation 712 of the method 700, an optimum size and a layout configuration from a plurality of layout configurations for displaying the baseline content and the at least one content element is determined by the apparatus. At operation 714 of the method 700, the baseline content and the at least one content element are stitched by the apparatus based on the optimum size and the layout configuration to dynamically generate a customized advertisement for the customer. At operation 716 of the method 700, display of the customized advertisement is caused on the display area associated with the web interface by the apparatus. The determination of the optimum size and layout configuration, stitching of content pieces for generation of the customized advertisement and the subsequent causing of display of the customized advertisement may be performed as explained with reference to operation 608 and is not explained again herein.

Without in any way limiting the scope, interpretation, or application of the claims appearing below, advantages of one or more of the exemplary embodiments disclosed herein provide numerous advantages. The techniques disclosed herein suggest techniques for dynamically optimizing personalized content provisioned to the customers. The apparatus disclosed herein determines what content works best for a customer or a customer persona as a whole for performing the optimization of the personalized content to be provisioned to the customer. Such, optimized content may help increase click rate of advertisements, which in turn may contribute to better sales. This may also help in improving customer satisfaction.

Moreover, as explained above, optimizing several ad-content pieces, such as a catalog of images related to an E-commerce Website, may not have been feasible using the conventional approach. However, dynamic or on-the-fly optimization of personalized content pieces using the techniques as disclosed herein greatly increases the chances of customers clicking on the advertisements and engaging in purchase transactions during their current journeys on the interaction channels.

Various embodiments described above may be implemented in software, hardware, application logic or a combination of software, hardware and application logic. The software, application logic and/or hardware may reside on one or more memory locations, one or more processors, an electronic device or, a computer program product. In an embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution apparatus, as described and depicted in FIG. 2. A computer-readable medium may include a computer-readable storage medium that may be any media or means that can contain or store the instructions for use by or in connection with an instruction execution system, system, or device, such as a computer.

Although the present invention has been described with reference to specific exemplary embodiments, it is noted that various modifications and changes may be made to these embodiments without departing from the broad spirit and scope of the present invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the apparatus 200, the processor 202 and its various components, the memory 204, the I/O module 206 and the communication module 208 may be enabled using software and/or using transistors, logic gates, and electrical circuits (for example, integrated circuit circuitry such as ASIC circuitry). Various embodiments of the present invention may include one or more computer programs stored or otherwise embodied on a computer-readable medium, wherein the computer programs are configured to cause a processor or computer to perform one or more operations (for example, operations explained herein with reference to FIGS. 6 and 7). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the present invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the present invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method comprising:
    determining, by an apparatus, at least one attribute associated with a customer active on a web interface associated with an enterprise;
    detecting, by the apparatus, a plurality of baseline contents and a plurality of content elements from a database by comparing position and size of objects identified in an advertisement with each other;
    extracting, by the apparatus, baseline contents from advertisements received by the apparatus from one or more advertisement servers to configure the plurality of baseline contents;
    selecting, by the apparatus, at least one baseline content from among the plurality of baseline contents and at least one content element from among the plurality of content elements based on the at least one attribute associated with the customer;
    generating, by the apparatus, a customized advertisement using the at least one baseline content and the at least one content element;
    extracting, by the apparatus, an image related to a product or a service from an advertisement from among the advertisements to configure the at least one baseline content for the customized advertisement;
    determining, by the apparatus, an optimum size and a layout configuration from a plurality of layout configurations for displaying the at least one baseline content and the at least one content element; and
    stitching, by the apparatus, the at least one baseline content and the at least one content element based on the optimum size and the layout configuration to generate the customized advertisement for the customer.

2. The method as claimed in claim 1, wherein the selected at least one content element corresponds to at least one of a personalized button and a personalized message.

3. The method as claimed in claim 1, further comprising:
    causing, by the apparatus, display of the customized advertisement on a display area associated with the web interface.

4. The method as claimed in claim 1, wherein remaining content subsequent to the extraction of the image from the advertisement configures non-baseline content; and
    wherein the non-baseline content comprises information related to at least one of edges, one or more objects supporting the baseline content, color schemes and layout configuration associated with the advertisement.

5. The method as claimed in claim 1, further comprising:
    receiving, by the apparatus, information related to customer activity on the web interface, the customer activity corresponding to at least one of a current visit of the customer to the web interface and one or more previous visits of the customer to the web interface, wherein the at least one customer attribute is determined, at least in part, based on the information related to the customer activity.

6. The method as claimed in claim 5, further comprising:
    predicting, by the apparatus, at least one intention of the customer using the information related to the customer activity, wherein an attribute from among the at least one attribute associated with the customer corresponds to the predicted at least one intention of the customer.

7. The method as claimed in claim 5, further comprising:
    predicting, by the apparatus, at least one persona of the customer using the information related to the customer activity, wherein an attribute from among the at least one attribute associated with the customer corresponds to the predicted at least one persona of the customer.

8. The method as claimed in claim 1, wherein the at least one attribute associated with the customer comprises attributes related to at least one of a current location of the customer, a weather associated with the current location, a device type of an electronic device used by the customer for accessing the web interface, a web browser associated with the electronic device, an Operating System (OS) associated with the electronic device, an age of the customer and a gender of the customer.

9. The method as claimed in claim 1, further comprising:
    generating, by the apparatus, a mapping linking each attribute from among a plurality of attributes associated with a plurality of customers to one or more baseline contents from among the plurality of baseline contents and one or more content elements from among the plurality of content elements; and
    storing the mapping in the database by the apparatus, wherein the stored mapping is accessed by the apparatus to cause selection of the at least one baseline content and the at least one content element based on the at least one attribute associated with the customer.

10. The method of claim 1, wherein optimum size further comprises optimizing content element alignment to provide a better fit for displaying the content element in the customized advertisement.

11. The method of claim 1, further comprising:
    using edge detection to automatically remove unwanted whitespace within the customized advertisement, wherein the content element appears bigger when shown inside the customized advertisement.

12. A computer-implemented method comprising:
   determining, by an apparatus, at least one attribute associated with a customer active on a web interface associated with an enterprise;
   detecting, by the apparatus, a plurality of baseline contents and a plurality of content elements from a database by comparing position and size of objects identified in an advertisement with each other;
   extracting, by the apparatus, baseline contents from advertisements received by the apparatus from one or more advertisement servers to configure the plurality of baseline contents;
   selecting, by the apparatus, at least one baseline content from among the plurality of baseline contents and at least one content element from among the plurality of content elements based on the at least one attribute associated with the customer;
   generating, by the apparatus, a customized advertisement using the at least one baseline content and the at least one content element;
   wherein the customized advertisement corresponds to a video advertisement; extracting, by the apparatus, one or more image frames comprising content related to a product or a service to be advertised from an advertisement from among the advertisements to configure the baseline content corresponding to the video advertisement;
   determining, by the apparatus, an optimum size and a layout configuration from a plurality of layout configurations for displaying the at least one baseline content and the at least one content element; and
   stitching, by the apparatus, the at least one baseline content and the at least one content element based on the optimum size and the layout configuration to generate the customized advertisement for the customer.

13. The method as claimed in claim 12, wherein generating the customized advertisement from the video advertisement comprises performing at least one of:
   reordering image frames associated with the video advertisement;
   inserting one or more objects of customer interest in the video advertisement; and
   removing at least one image frame or at least one image frame object of no interest to the customer from the video advertisement.

14. The method of claim 12, wherein optimum size further comprises optimizing content element alignment to provide a better fit for displaying the content element in the customized advertisement.

15. The method of claim 12, further comprising:
   using edge detection to automatically remove unwanted whitespace within the customized advertisement, wherein the content element appears bigger when shown inside the customized advertisement.

16. An apparatus comprising:
   a memory for storing instructions; and
   a processor configured to execute the instructions and thereby cause the apparatus to perform at least:
      determine at least one attribute associated with a customer active on a Web interface associated with an enterprise;
      detect a plurality of baseline contents and a plurality of content elements from a database by comparing position and size of objects identified in an advertisement with each other;
      extract baseline contents from advertisements received by the apparatus from one or more advertisement servers to configure the plurality of baseline contents;
      select at least one baseline content from among the plurality of baseline contents and at least one content element from among the plurality of content elements based on the at least one attribute associated with the customer;
      generate a customized advertisement using the at least one baseline content and the at least one content element;
      extract an image related to a product or a service from an advertisement from among the advertisements to configure the at least one baseline content for the customized advertisement;
      determine an optimum size and a layout configuration from a plurality of layout configurations for displaying the at least one baseline content and the at least one content element;
      stitch the at least one baseline content and the at least one content element based on the optimum size and the layout configuration to generate the customized advertisement for the customer; and
      cause display of the customized advertisement on a display area associated with the web interface.

17. The apparatus as claimed in claim 16 wherein the selected at least one content element corresponds to at least one of a personalized button and a personalized message.

18. The apparatus of claim 16, wherein optimum size further comprises optimizing content element alignment to provide a better fit for displaying the content element in the customized advertisement.

19. The apparatus of claim 16, further comprising:
   using edge detection to automatically remove unwanted whitespace within the customized advertisement, wherein the content element appears bigger when shown inside the customized advertisement.

20. An apparatus comprising:
   a memory for storing instructions; and
   a processor configured to execute the instructions and thereby cause the apparatus to perform at least:
      determine at least one attribute associated with a customer active on a Web interface associated with an enterprise;
      detect a plurality of baseline contents and a plurality of content elements from a database by comparing position and size of objects identified in an advertisement with each other;
      extract baseline contents from advertisements received by the apparatus from one or more advertisement servers to configure the plurality of baseline contents;
      select at least one baseline content from among the plurality of baseline contents and at least one content element from among the plurality of content elements based on the at least one attribute associated with the customer; and
      generate a customized advertisement using the at least one baseline content and the at least one content element;
      wherein the customized advertisement corresponds to a video advertisement;
      extract one or more image frames comprising content related to a product or a service to be advertised from an advertisement from among the advertisements to configure the baseline content corresponding to the video advertisement;

determine an optimum size and a layout configuration from a plurality of layout configurations for displaying the at least one baseline content and the at least one content element;

stitch the at least one baseline content and the at least one content element based on the optimum size and the layout configuration to generate the customized advertisement for the customer; and cause display of the customized advertisement on a display area associated with the web interface.

21. The apparatus as claimed in claim 20, wherein for generating the customized advertisement the apparatus is further caused to perform at least one of:

reorder image frames associated with the video advertisement;

insert one or more objects of customer interest in the video advertisement; and remove at least one image frame or at least one image frame object of no interest to the customer from the video advertisement.

22. The apparatus of claim 20, wherein optimum size further comprises optimizing content element alignment to provide a better fit for displaying the content element in the customized advertisement.

23. The apparatus of claim 20, further comprising:

using edge detection to automatically remove unwanted whitespace within the customized advertisement, wherein the content element appears bigger when shown inside the customized advertisement.

24. A computer-implemented method comprising:

detecting, by an apparatus, an occurrence of a customer browsing event on a web interface associated with an enterprise;

receiving, by the apparatus, information related to at least one of:
  customer activity on the web interface,
  device information related to an electronic device used for accessing the web interface,
  historical browsing data of the customer, and
  profile data of the customer;

determining, by the apparatus, at least one attribute associated with the customer active on the web interface based on the received information;

detecting, by the apparatus, a plurality of baseline contents and a plurality of content elements from a database by comparing position and size of objects identified in an advertisement with each other;

extracting, by the apparatus, a baseline content from an advertisement received by the apparatus from an advertisement server for display on a display area associated with the web interface;

selecting, by the apparatus, at least one content element from among a plurality of content elements stored in a database based on the at least one attribute associated with the customer;

determining, by the apparatus, an optimum size and a layout configuration from a plurality of layout configurations for displaying the baseline content and the at least one content element;

extracting an image related to a product or a service is extracted from an advertisement from among the advertisements to configure the at least one baseline content for the customized advertisement; and stitching, by the apparatus, the baseline content and the at least one content element based on the optimum size and the layout configuration to dynamically generate a customized advertisement for the customer; and causing, by the apparatus, the display of the customized advertisement on the display area associated with the web interface.

25. The method as claimed in claim 24, wherein the selected at least one content element corresponds to at least one of a personalized button and a personalized message for the customer.

26. The method of claim 24, wherein optimum size further comprises optimizing content element alignment to provide a better fit for displaying the content element in the customized advertisement.

27. The method of claim 24, further comprising:

using edge detection to automatically remove unwanted whitespace within the customized advertisement, wherein the content element appears bigger when shown inside the customized advertisement.

* * * * *